US010690063B2

(12) United States Patent
Varelis et al.

(10) Patent No.: US 10,690,063 B2
(45) Date of Patent: Jun. 23, 2020

(54) EXHAUST GAS FLAP

(71) Applicant: Eberspächer Exhaust Technology GmbH & Co. KG, Neunkirchen (DE)

(72) Inventors: Stefanos Varelis, Leinfelden (DE); Steffen Schmitt, Ostfildern (DE)

(73) Assignee: EBERSPÄCHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 134 days.

(21) Appl. No.: 15/632,694

(22) Filed: Jun. 26, 2017

(65) Prior Publication Data
US 2018/0128189 A1 May 10, 2018

(30) Foreign Application Priority Data

Jun. 27, 2016 (DE) .................. 10 2016 111 681

(51) Int. Cl.
*F02D 9/10* (2006.01)
*F16K 1/22* (2006.01)
(Continued)

(52) U.S. Cl.
CPC ............. *F02D 9/1045* (2013.01); *F01N 1/18* (2013.01); *F02D 9/04* (2013.01); *F02D 9/1005* (2013.01); *F02D 9/107* (2013.01); *F16K 1/222* (2013.01); *F16K 1/2263* (2013.01); *F01N 1/165* (2013.01); *F01N 1/166* (2013.01); *F01N 2240/36* (2013.01); *F16K 15/148* (2013.01)

(58) Field of Classification Search
CPC ... F16K 1/18; F16K 1/22; F16K 1/222; F16K 1/223; F16K 1/226; F16K 1/2261; F16K 1/2263; F16K 1/224; F16K 1/36; F16K 1/42; F16K 1/44; F16K 1/425; F16K 1/427; F16K 37/36; F16K 37/30; F16K 11/052; F16K 11/0525; F16K 15/03; F16K 15/035; F16K 15/036; F16K 15/038; F02D 9/10; F02D 9/08; F02D 9/107; F02D 9/1005; F02D 9/101; F02D 9/1015; F02D 9/109;
(Continued)

(56) References Cited

U.S. PATENT DOCUMENTS 4,032,108 A   6/1977   Kintner
4,164,236 A   8/1979   Owen et al.
(Continued)

FOREIGN PATENT DOCUMENTS

DE   490311 C   * 1/1930   ............... F16K 1/22
DE   9300783 U1 * 5/1994   ............... F02D 9/02
(Continued)

*Primary Examiner* — Hailey K. Do
(74) *Attorney, Agent, or Firm* — McGlew and Tuttle, P.C.

(57) ABSTRACT

An exhaust gas flap, especially for the exhaust gas stream of an internal combustion engine, includes a flap tube (24), a flap diaphragm (26). The flap diaphragm (26) is carried in the interior of the flap tube (24) on a pivot shaft (18), rotatable about a pivot axis (A). The flap diaphragm (26) has at least one flap diaphragm part (28, 30) and a mounting area (40) enclosing the pivot shaft (18) in at least some areas. A wing stop (42, 44) is provided at an inner circumferential area of the flap tube (24) in association with at least one flap diaphragm part (28, 30). A recess (60, 62, 64, 66) at the flap diaphragm (26), receiving a circumferential end area (48, 50) of a wing stop (42, 44), is provided in at least one axial end area of the mounting area (40).

12 Claims, 4 Drawing Sheets

(51) Int. Cl.
*F16K 1/226* (2006.01)
*F01N 1/18* (2006.01)
*F02D 9/04* (2006.01)
*F01N 1/16* (2006.01)
*F16K 15/14* (2006.01)

(58) Field of Classification Search
CPC . F02D 9/1095; F02M 26/70; Y10T 137/0525; Y10T 29/49307; Y10T 29/49405
USPC .................................................. 251/305, 308
See application file for complete search history.

(56) References Cited

U.S. PATENT DOCUMENTS

| | | | |
|---|---|---|---|
| 4,380,246 A * | 4/1983 | Casale | F16K 1/22 |
| | | | 137/340 |
| 5,269,493 A * | 12/1993 | Junier | B60R 25/0225 |
| | | | 137/375 |
| 10,167,785 B2 * | 1/2019 | Oblinger | F02D 9/1045 |
| 2004/0021119 A1 * | 2/2004 | Hattori | F16K 1/2261 |
| | | | 251/306 |
| 2012/0326069 A1 * | 12/2012 | Takai | F16K 1/222 |
| | | | 251/314 |

FOREIGN PATENT DOCUMENTS

| | | | |
|---|---|---|---|
| DE | 10 2008 034341 A1 | 1/2010 | |
| DE | 102009013815 A1 * | 9/2010 | ............... F02D 9/04 |
| DE | 102009026797 A1 * | 12/2010 | ............ F02B 37/013 |
| DE | 11 2010 005 713 T5 | 4/2013 | |
| DE | 102016223444 B3 * | 5/2018 | ............. F01N 13/08 |
| FR | 1 150 573 A | 1/1958 | |
| JP | 2002-13649 A | 1/2002 | |
| WO | WO-2012131751 A1 * | 10/2012 | ................ F16K 1/22 |

* cited by examiner

EXHAUST GAS FLAP

CROSS REFERENCE TO RELATED APPLICATIONS

This application claims the benefit of priority under 35 U.S.C. § 119 of German Application 10 2016 111 681.5, filed Jun. 27, 2016, the entire contents of which are incorporated herein by reference.

FIELD OF THE INVENTION

The present invention pertains to an exhaust gas flap, especially for the exhaust gas stream of an internal combustion engine, comprising a flap tube, a flap diaphragm, which is carried in the interior of the flap tube on a pivot shaft rotatable about a pivot axis, with at least one flap wing and with a mounting area enclosing the pivot shaft in at least some areas, wherein a wing stop is provided at an inner circumferential area of the flap tube in association with at least one flap wing.

BACKGROUND OF THE INVENTION

Such exhaust gas flaps are used to release exhaust systems, for example, of an internal combustion engine in a motor vehicle, for the flow of exhaust gas or to block or to partly block said exhaust systems against flow. In particular, if the flap diaphragm of such an exhaust gas flap is in its blocked position, exhaust gas can flow through gaps formed between the flap diaphragm or the pivot shaft carrying same and the flap tube, wherein disturbing noises may develop or as a result of which an exhaust system having such an exhaust gas flap may have an insufficient acoustic tightness.

SUMMARY OF THE INVENTION

An object of the present invention is to provide an exhaust gas flap, especially for the exhaust gas stream of an internal combustion engine, in which in case of a structurally simple configuration, gaps are avoided to the greatest extent between the flap diaphragm or a pivot shaft carrying same and a flap tube in case of a flap diaphragm positioned in a blocked position.

According to the present invention, this object is accomplished by an exhaust gas flap, especially for the exhaust gas stream of an internal combustion engine, comprising a flap tube, a flap diaphragm, which is carried in the interior of the flap tube on a pivot shaft rotatable about a pivot axis, with at least one flap wing, preferably two flap wings, and with a mounting area enclosing the pivot shaft in at least some areas, wherein a wing stop is provided at an inner circumferential area of the flap tube in association with at least one flap wing, wherein a recess at the flap diaphragm, receiving a circumferential end area of a wing stop in relation to the inner circumference of the flap tube or a flap tube longitudinal axis, is provided in at least one axial end area of the mounting area.

It is ensured in case of the exhaust gas flap according to the present invention by structurally simple features that a gap unavoidably existing in the adjoining area of a wing stop at the pivot shaft carrying the flap diaphragm can be reduced by the wing stop being brought closer to the pivot shaft or that this gap can be overlapped by a flap wing.

In order to guarantee a reliable, essentially full closing of the flap tube in case of a flap diaphragm positioned in a blocked position, it is proposed that the pivot axis be carried rotatably about the pivot axis in its two axial end areas at the flap tube, and that at least one wing stop, preferably two wing stops, extend preferably without interruption in the circumferential direction from a first circumferential end area positioned in the area of a first axial end area of the pivot shaft to a second circumferential end area positioned in the area of a second axial end area of the pivot shaft and have a stop surface for the installation of an associated flap wing.

The flow of exhaust gas through a gap formed between the wing stop and the pivot shaft may preferably be prevented to the greatest extent by at least one wing stop having a circumferential distance to the associated axial end area of the pivot shaft in at least one of its circumferential end areas, and by a gap formed by this circumferential distance between the pivot shaft and the wing stop being essentially completely overlapped in the circumferential direction by a flap wing when the flap wing is in contact with the stop surface of this wing stop.

This covering functionality can be achieved according to the principles of the present invention, for example, by at least one flap wing, preferably both flap wings, extending in the axial direction beyond the mounting area in the area of its recess or/and extending up to the outer circumference of the pivot shaft in at least one axial end area, preferably both axial end areas, of the mounting area.

It is proposed in one embodiment variant according to the present invention that the flap diaphragm comprise two flap diaphragm parts, wherein each flap diaphragm part comprises a flap wing and a mounting area section enclosing the pivot shaft in some areas, wherein a wing stop is provided at the inner circumference of the flap tube in association with each flap wing.

In such an embodiment of the flap diaphragm with two flap diaphragm parts, the configuration can be simplified by the two flap diaphragm parts having a design essentially identical to one another.

In order to guarantee that the mounting area sections of the flap diaphragm parts do not adjoin the wing stops associated with each of the other flap diaphragm parts in case of pivoting the flap diaphragm from its blocked position in the direction of a released position and thereby moving a respective flap wing away from its wing stop, it is proposed that a recess be provided in at least one axial end area of the mounting area section of at least one of the flap diaphragm parts for receiving a wing stop associated with the flap wing of the other flap diaphragm part. In this case, the recess is preferably open in the direction towards the other flap diaphragm part in the axial direction and in the circumferential direction.

In order to be able to achieve a symmetrical configuration in relation to the pivot axis or the pivot axis carrying the flap diaphragm parts, it is proposed that the mounting area sections of the two flap diaphragm parts enclose the pivot shaft at circumferential areas essentially located opposite one another, or/and that the flap wings of the two flap diaphragm parts be arranged offset in relation to each other when flap wings are in contact with the associated wing stops in the direction of a longitudinal axis of the flap tube.

In this case, provisions may further be made for the wing stops provided in association with the two flap wings to be arranged essentially not offset in relation to each other on both circumferential sides relative to the pivot shaft in the direction of the flap tube longitudinal axis and to provide each a stop surface for the associated flap wing on sides located opposite one another in the direction of the flap tube longitudinal axis.

In one embodiment, which is especially advantageous because of the small number of components, it is proposed that the mounting area be configured as tubular and as enclosing the pivot shaft, and that one flap wing always extend away from the mounting area from circumferential areas of the mounting area essentially located opposite one another. In this embodiment, the flap diaphragm has, e.g., an essentially one-piece configuration. The flap wings and the mounting area may be provided as a block of material.

In order to be able to obtain a recess to be provided for receiving a wing stop in a simple manner in this embodiment, it is proposed that a recess be provided in at least one axial end area of the mounting area by at least one flap wing, preferably each flap wing, extending in the axial direction beyond the tubular mounting area.

In one embodiment of the flap diaphragm with the tubular mounting area and the two flap wings, which is stable and easy to manufacture, provisions may be made for the flap wings to be arranged essentially not offset in relation to each other when the flap wings are in contact with the associated wing stops in the direction of a flap tube longitudinal axis, and for the wing stops provided in association with the two flap wings to be arranged offset in relation to each other on both circumferential sides relative to the pivot shaft in the direction of the flap tube longitudinal axis and to provide each a stop surface for the associated flap wing on sides facing one another in the direction of the flap tube longitudinal axis.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
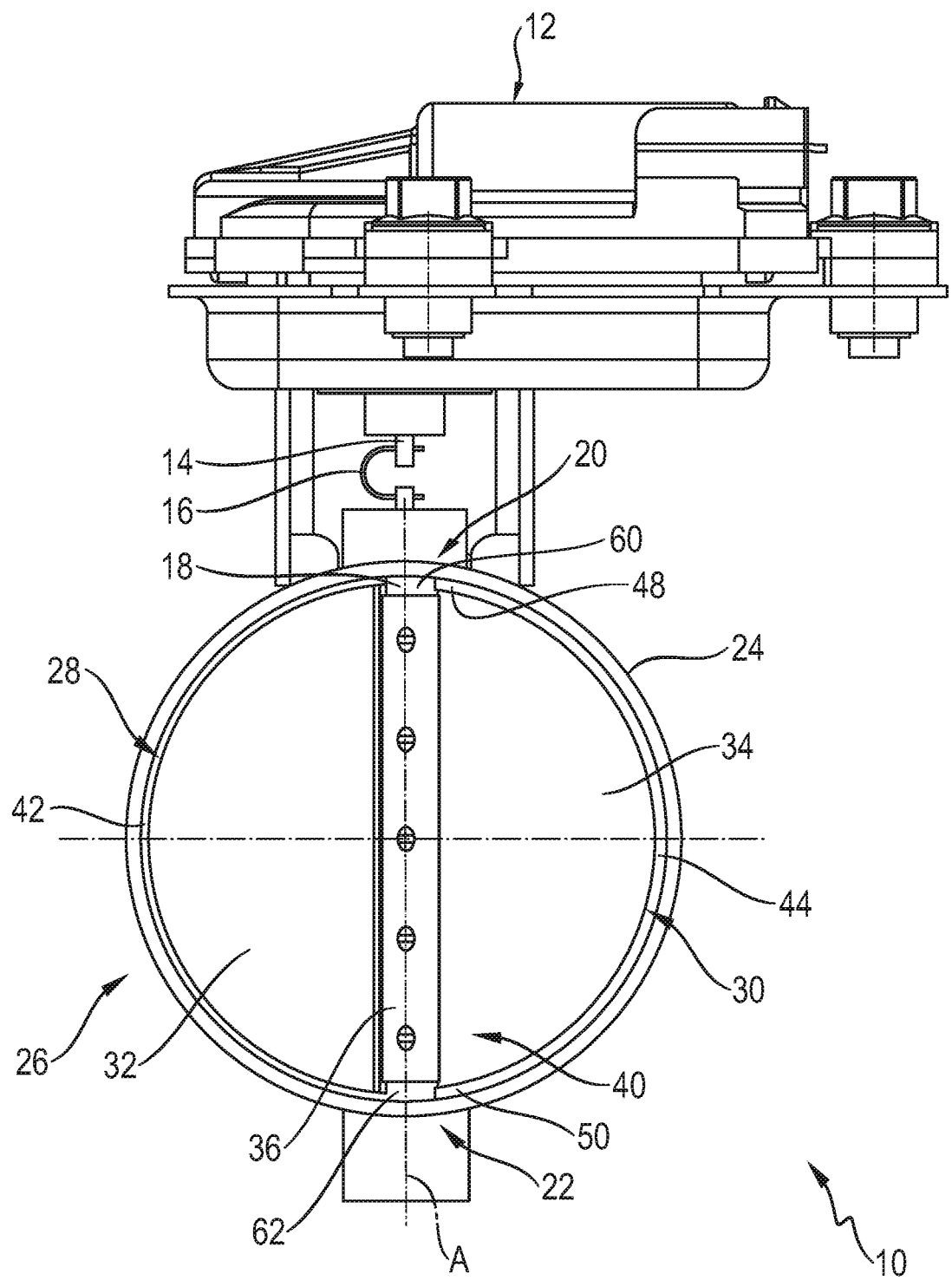
FIG. 1 is a lateral view of an exhaust gas flap for an exhaust system of an internal combustion engine with a flap drive.
Figure 2:
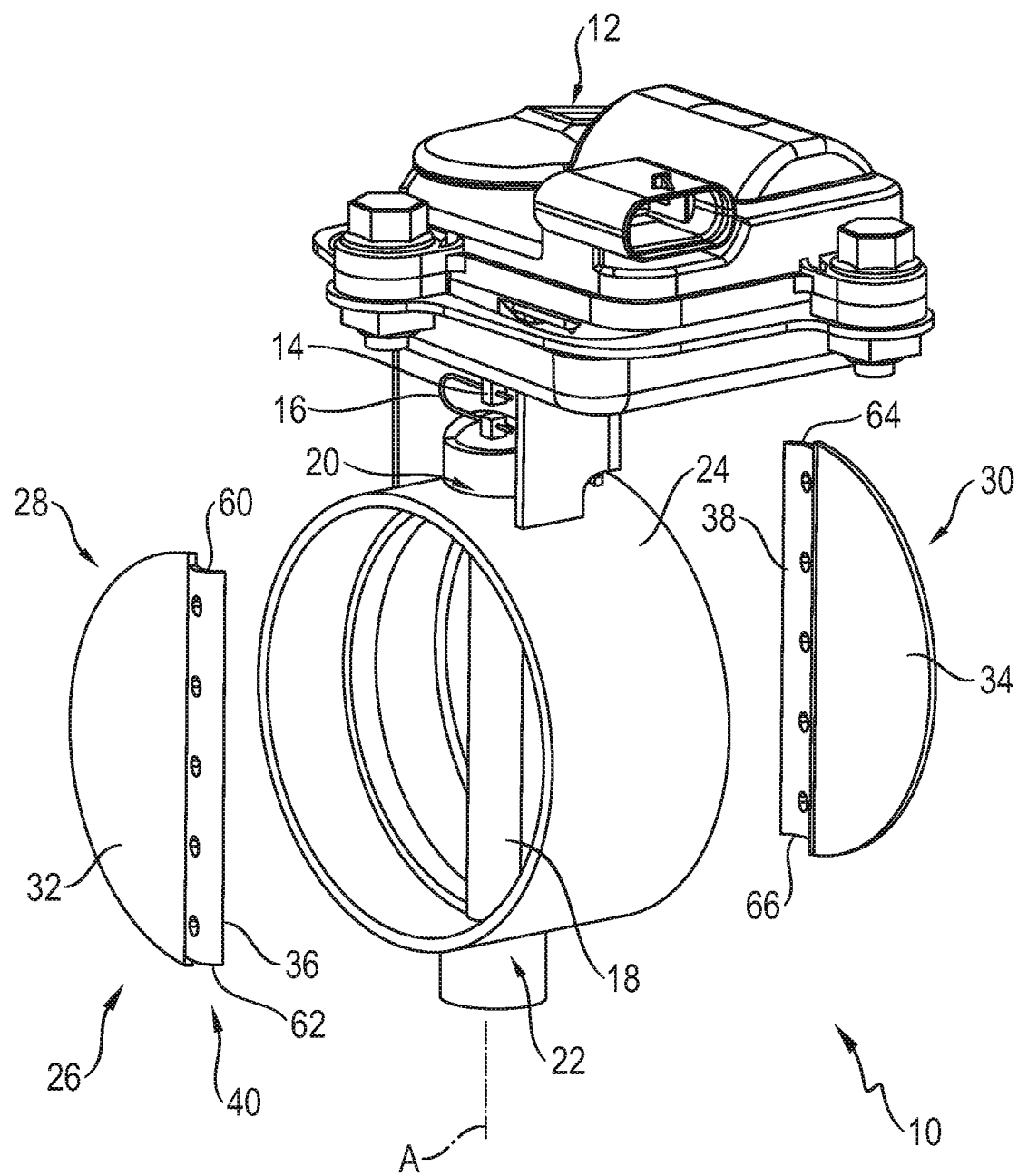
FIG. 2 is a partially exploded in a perspective view showing the exhaust gas flap from FIG. 1.

Referring to the drawings, an exhaust gas flap which can be used, for example, in an exhaust system of an internal combustion engine is designated by 10 in FIG. 1. A flap drive 12, which operates, for example, by means of an electric motor, is associated with the exhaust gas flap 10. A drive element 14, for example, drive shaft, of the flap drive 12 is coupled to the exhaust gas flap 10 via a coupling element 16, which is configured, for example, as a bow spring made of wire material, for the joint rotation with a pivot shaft 18. The pivot shaft 18 is carried pivotably about a pivot axis A in its two end areas 20, 22 via bearings, not shown, at a flap tube 24.

A flap diaphragm, which is generally designated with 26, is carried at the pivot shaft 18 in the interior of the flap tube 24, which has an essentially circular cross section and correspondingly circular inner contour in this exemplary embodiment. In the exemplary embodiment of FIGS. 1 through 4, the flap diaphragm 26 comprises two flap diaphragm parts 28, 30, which have, e.g., a one-piece configuration. Each of the two flap diaphragm parts 28, 30 in turn comprises a flap wing 32, 34 as well as a mounting area section 36, 38. Each of the two mounting area sections 36, 38 has a curved configuration adapted to the outer contour of the pivot shaft 18 and each encloses the pivot shaft 18 in a partial area of the outer circumference thereof. The two mounting area sections 36, 38 thus together form a mounting area 40 for the flap diaphragm 26. The flap diaphragm parts 28, 30 can be mounted, for example, by welding at the pivot shaft 18 in this mounting area 40 or in the area of the mounting area sections 36, 38.

Figure 3:
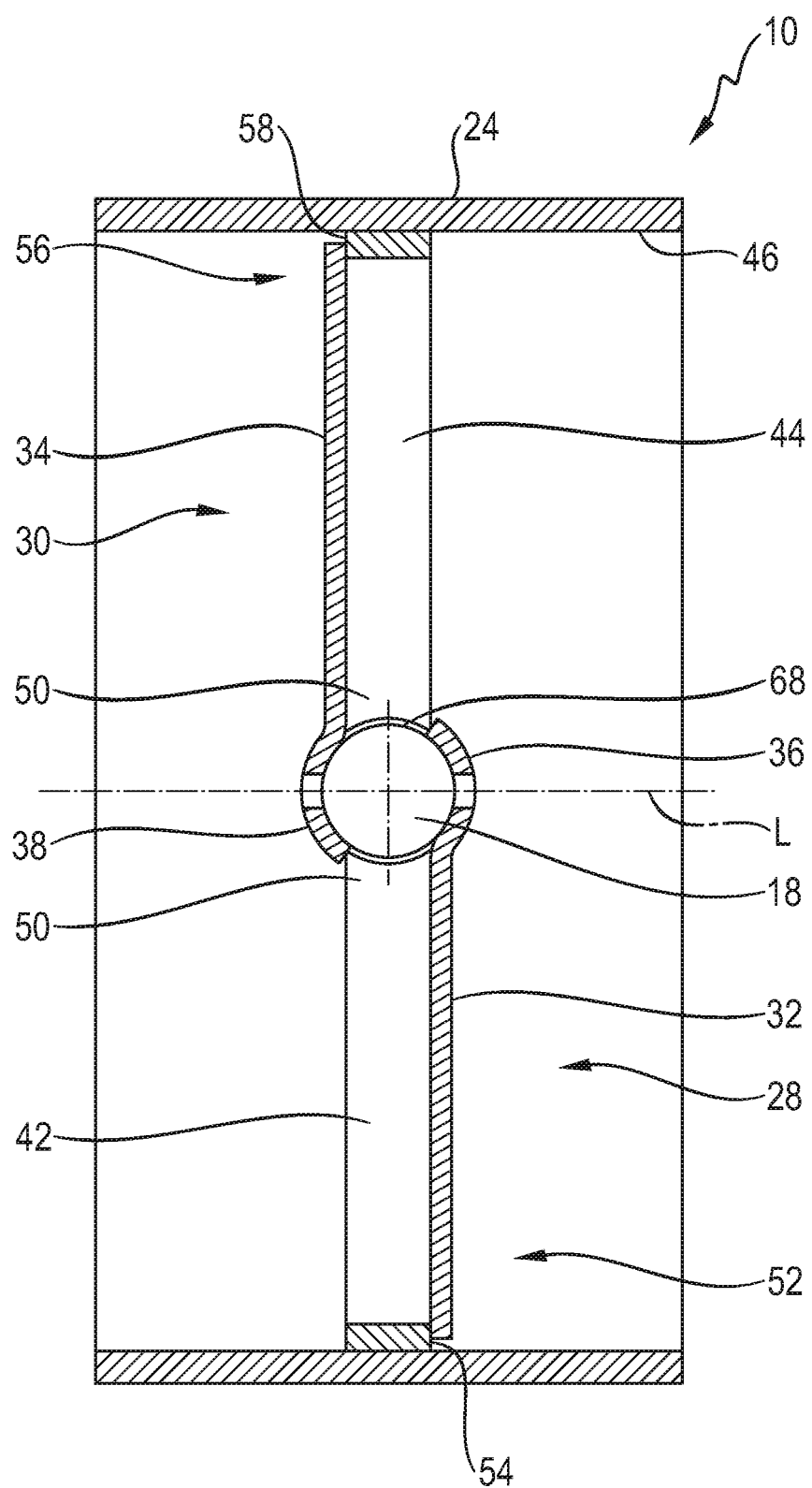
FIG. 3 is a sectional view of the exhaust gas flap from FIG. 1, cut along a line III-III in FIG. 1.

A wing stop 42, 44 having a ring-segment-like configuration is provided at the flap tube 24 in association with each of the two flap wings 32, 34 or with each flap diaphragm part 28, 30. The two wing stops 42, 44 may be fixed, for example, by connection in substance at the inner circumference 46 of the flap tube 24, but may also be provided with the flap tube 24 as an integral component of same. As is illustrated in FIG. 1, for example, on the basis of the wing stop 44, this wing stop 44 extends without interruption along the inner circumference 46 of the flap tube 24 starting from a first circumferential end area 48 located close to the first axial end area 20 of the pivot shaft 18 to a second circumferential end area 50 located close to the second axial end area 22 of the pivot shaft 18. The wing stop 42 provides a stop surface 54 for the flap wing 28 on a side 52 oriented in the direction of a flap tube longitudinal axis L. Correspondingly, the wing stop 44 provides a stop surface 58 for the flap wing 34 on a front side 56 oriented in the direction of the flap tube longitudinal axis L. It is seen in FIG. 3 that the two wing stops 42, 44 are arranged essentially in the same axial area in relation to the flap tube longitudinal axis, so that the two stop surfaces 54, 58, which are oriented in a direction away from one another, are offset in relation to each other in the direction of the flap tube longitudinal axis L.

In order to leave as few gaps as possible in the adjoining area of the circumferential end areas 48, 50 at the pivot shaft 18, each of the wing stops 42, 44 is brought as close as possible to the pivot shaft 18 in these circumference end areas 48, 50. In order to make this possible, the flap diaphragm 26 or each flap diaphragm part 28, 30 in the respective mounting area section 36, 38 has a recess 60, 62, 64, 66 at the end areas thereof located oriented in the direction of the pivot axis A. This recess may be provided by the mounting area sections 36, 38 being shorter in the direction of the pivot axis A than the flap wing 32, 34 connected to each of these sections. This means that the flap wings 32, 34 in the axial end areas of the flap diaphragm parts 28, 30 project axially over that area of the mounting area sections 36, 38, in which the recesses 60, 62, 64, 66 are provided.

Figure 4:
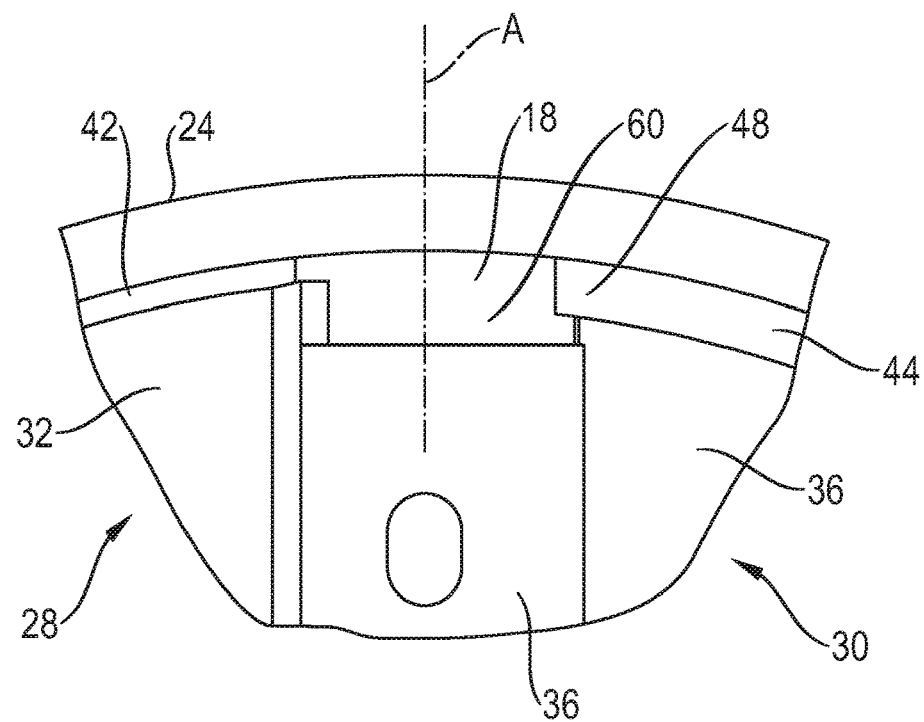
FIG. 4 is a detail view of the exhaust gas flap from FIG. 1 in the adjoining area of a pivot shaft carrying a flap diaphragm at a flap tube of the exhaust gas flap.

It can be seen in FIG. 1 and in FIG. 4 that the wing stop 44 extends with its first circumferential end area 48 so close to the pivot axis 18 that the first circumferential end area 48 meshes with the recess 60 of the flap diaphragm part 28 present in this area, at least when the flap wing part 28 or the mounting area section 36 thereof also pivots about the pivot axis A by rotating the pivot shaft 18 about the pivot axis A, and the flap wing 32 of the flap wing part 28 approaches the first circumferential end area 48 of the wing stop 44 in the circumferential direction in relation to the pivot axis A. Since the flap wing 34 of the flap wing part 30 located behind the wing stop 44 in FIG. 4 and interacting with same extends up to the pivot shaft 18, a gap 68, which is nonetheless unavoidably formed between the first circumferential end area 48 of the wing stop 44 and the pivot shaft 18, is essentially completely overlapped by the flap wing 34 in the circumferential direction. To keep this gap 68 as small as possible, the wing stop 44 may have a concave configuration in its first circumferential end area 48, adapted to the circular outer circumferential contour of the pivot shaft 18, and thus enclose the pivot shaft 18 in some areas in the circumferential direction.

The functionality shown above with reference to the first circumferential end area 48 of the wing stop 44 is correspondingly also achieved in all other circumferential end areas of the wing stops 42, 44. It is thus ensured that as few flow leaks as possible occur especially in the adjoining area of the wing stops 42, 44 at the pivot shaft 18 in the blocked position, shown in FIG. 1 and also in FIG. 3, of the flap diaphragm 26, in which the two flap wings 32, 34, which are arranged offset in relation to each other in the direction of the flap tube longitudinal axis L, are in contact with their associated stop surfaces 54, 58 and thus block the flap tube 24 essentially against flow. This avoids disturbing noises, on the one hand, and provides an essentially noise-proof configuration, on the other hand. The embodiment of the flap diaphragm 26 with two flap diaphragm parts 28, 30 further makes possible a tolerance compensation between the flap diaphragm parts 28, 30 and the wing stops 42, 44 associated with same when the flap diaphragm parts 28, 30 are mounted with their mounting area sections 36, 38 during assembly. In this connection, the flap diaphragm parts 28, 38 can be positioned with their flap wings 32 34 being in contact with the associated wing stops 42, 44 and are subsequently connected to the pivot shaft 18 essentially independently of one another.

Figure 5:
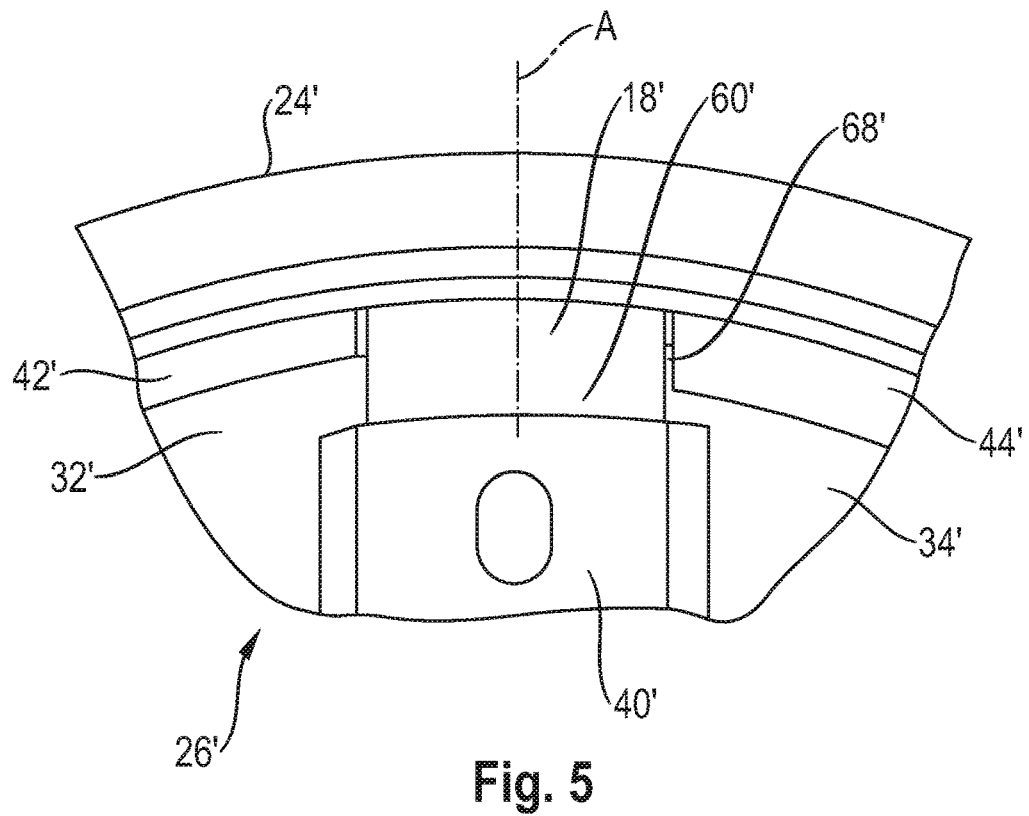
FIG. 5 is a view corresponding to FIG. 4 of an alternative embodiment.

FIG. 5 shows an alternative embodiment. FIG. 5 shows a configuration, in which the flap diaphragm 26' has a one-piece configuration. The flap diaphragm 26' comprises a mounting area 40', which is tubular and encloses the pivot shaft 18', from which mounting area 40' the flap wings 32', 34' extend on both sides of the pivot shaft 18'. In the axial end areas, the flap wings 32', 34' extend beyond the mounting area 40', so that recesses, which can be seen in FIG. 5 on the basis of a recess 60', are formed in each of the areas located between the two flap wings 32', 34'. The circumferential end areas, which can be seen in FIG. 5 on the basis of the first circumferential end area 48' of the wing stop 44', extend into these recesses up to close to the pivot axis 18', so that the gap 68' is formed between them. This gap 68' is overlapped by the flap wing 34', which is located behind the wing stop 44' in FIG. 5, wherein the flap wing 34', in its area extending axially beyond the mounting area 40', extends up to the outer circumference of the pivot shaft 18'. This configuration may be provided in the adjoining area of each circumferential end area of the two wing stops 42', 44' at the pivot shaft 18'. In this case, the two flap wings 32', 34' are preferably located in one plane and are thus not offset in relation to each other in relation to the flap tube longitudinal axis in case of positioning the flap diaphragm 26' in the blocked position. Hence, it is necessary to arrange the two wing stops 42', 44' or the stop surfaces provided at same correspondingly axially offset in relation to each other, but oriented facing each other.

Also with the configuration shown in FIG. 5, the possibility is offered to bring the wing stops in their circumferential end areas very close to the pivot shaft 18' and to almost completely overlap a gap 68' formed between them in the circumferential direction in relation to the flap tube longitudinal axis and in the direction of the pivot axis A of the pivot shaft 18'.

While specific embodiments of the invention have been shown and described in detail to illustrate the application of the principles of the invention, it will be understood that the invention may be embodied otherwise without departing from such principles.

What is claimed is:

1. An exhaust gas flap for an exhaust gas stream of an internal combustion engine, the exhaust gas flap comprising:
   a flap tube;
   a pivot shaft in an interior of the flap tube and rotatable about a pivot axis; and
   a flap diaphragm carried in the interior of the flap tube, having a mounting area enclosing the pivot shaft in some areas and being mounted on the pivot shaft, the flap diaphragm comprising two separate flap diaphragm parts of identical configuration, each separate flap diaphragm part being of a one piece configuration and comprising a flap wing and a curved mounting area section of the mounting area, the curved mounting area sections enclosing the pivot shaft in some areas thereof, the two separate flap diaphragm parts being fixed to the pivot shaft with the respective curved mounting area section thereof independently from each other;
   two wing stops, each one of the two wing stops associated with a respective one of the two separate flap diaphragm parts, each one of the two wing stops comprising a ring segment fixed to an inner circumferential area of the flap tube in association with the two separate diaphragm parts and providing a stop surface, the stop surfaces of the two wing stops being offset in relation to each other in a direction of a flap tube longitudinal axis and being oriented to face away from each other; and
   a recess is provided in each axial end area of the curved mounting area sections of each one of the two separate flap diaphragm parts, each recess for receiving the respective wing stop associated with the flap wing of the other one of the two separate flap diaphragm parts, each recess of a respective one of the two separate flap diaphragm parts being open both in a diametrical direction of the flap tube and in one circumferential direction around the pivot shaft from the respective one of the two separate flap diaphragm parts toward the other one of the two separate flap diaphragm parts.

2. An exhaust gas flap in accordance with claim 1, wherein:
   in each axial end area of the mounting area, the flap wings extend in a diametrical direction of the flap tube beyond the mounting area to the area of the recess, or extend up to an outer circumference of the pivot shaft, or extend in the diametrical direction of the flap tube beyond the mounting area to the area of the recess and extend up to the outer circumference of the pivot shaft.

3. An exhaust gas flap in accordance with claim 1, wherein:
   each of the curved mounting area sections and the two separate flap diaphragm parts together partially enclose the pivot shaft.

4. An exhaust gas flap in accordance with claim 1, wherein:
   the mounting area of the flap diaphragm partially encloses the pivot shaft.

5. An exhaust gas flap in accordance with claim 1, wherein:
   both the curved mounting area sections of the two separate flap diaphragm parts enclose the pivot shaft at circumferential areas essentially located opposite one another, and the flap wings of the two separate flap diaphragm parts are arranged offset in relation to each other in the direction of a flap tube longitudinal axis when the flaps wings are in contact with the associated wing stops;
   the wing stops provided in association with the two flap wings are arranged essentially not offset in relation to each other in the direction of the flap tube longitudinal axis on both circumferential sides in relation to the pivot shaft, the wing stops providing stop surfaces for the associated flap wings on sides located opposite one another in the direction of the flap tube longitudinal axis;
   the wing stops are separate structure from the flap tube;
   an axial length of the wing stops along the flap tube longitudinal axis is equal to the offset of the the two separate flap diaphragm parts.

6. An exhaust gas flap in accordance with claim 1, wherein:
   each recess of a respective one of the two separate flap diaphragm parts is provided by a stepped structure of an axial end area of the respective curved mounting area.

7. An exhaust gas flap in accordance with claim 1, wherein:
   the pivot shaft is carried, rotatably about the pivot axis at the flap tube, in each of a first axial end area and a second axial end area;
   the two wing stops extend, without interruption in a circumferential direction relative to an inner circumference of the flap tube, from a first circumferential end area thereof, which is positioned in an area of the first axial end area of the pivot shaft, to a second circumferential end area, which is positioned in an area of the second axial end area of the pivot shaft, each stop surface configured for abutment of a respective one of the flap wings.

8. An exhaust gas flap in accordance with claim 7, wherein:
   each wing stop, in at least one of the first circumferential end area and the second circumferential end area, has a circumferential distance to the associated axial end area of the pivot shaft forming a gap; and
   each gap, which is formed by the circumferential distance between the pivot shaft and each one of the wing stops, is essentially completely overlapped in the circumferential direction by one of the flap wings when the flap wing is in contact with the respective stop surface of the associated wing stop.

9. An exhaust gas flap in accordance with claim 1, wherein:
   the curved mounting area sections of the two separate flap diaphragm parts enclose the pivot shaft at circumferential areas essentially located opposite one another; or
   the flap wings of the two separate flap diaphragm parts are arranged offset in relation to each other in the direction of the flap tube longitudinal axis when the flaps wings are in contact with the associated wing stops; or
   both the curved mounting area sections of the two separate flap diaphragm parts enclose the pivot shaft at circumferential areas essentially located opposite one another and the flap wings of the two separate flap diaphragm parts are arranged offset in relation to each other in the direction of the flap tube longitudinal axis when the flaps wings are in contact with the associated wing stops.

10. An exhaust gas flap in accordance with claim 9, wherein the wing stops provided in association with the two flap wings are arranged essentially not offset in relation to each other in the direction of the flap tube longitudinal axis on both circumferential sides in relation to the pivot shaft, the wing stops providing stop surfaces for the associated flap wings on sides located opposite one another in the direction of the flap tube longitudinal axis.

11. An exhaust gas flap for an exhaust gas stream of an internal combustion engine, the exhaust gas flap comprising:
   a flap tube;
   a pivot shaft rotatably arranged in an interior of said flap tube about a pivot axis;
   a first flap diaphragm part having a first curved mounting area and a first flap wing, said first curved mounting area and said first flap wing being formed as a one-piece configuration, said first curved mounting area being arranged on said pivot shaft to at least partially enclose said pivot shaft, said first curved mounting area defining a a first recess by an edge of said first curved mounting area extending along said pivot axis, and by another edge extending in a rotational direction of said pivot shaft;
   a second flap diaphragm part having a second curved mounting area and a second flap wing, said second curved mounting area and said second flap wing being formed as a one-piece configuration, said second curved mounting area being arranged on said pivot shaft to at least partially enclose said pivot shaft, said second curved mounting area defining a second recess by an edge extending along said pivot axis, and by another edge extending in the rotational direction of said pivot shaft;
   said first flap diaphragm part and said second flap diaphragm part being of identical configuration, being separate from each other, and being fixed to said pivot shaft independently from each other;
   a first wing stop comprising a first ring segment fixed to a first inner circumferential area of said flap tube, said first wing stop having a first stop surface, said first flap diaphragm part being rotatable with said pivot shaft to cause said first flap wing to contact said first stop surface, and partially block said flap tube;
   a second wing stop comprising a second ring segment fixed to a second inner circumferential area of said flap tube, said second wing stop having a second stop surface, said second flap diaphragm part being rotatable with said pivot shaft to cause said second flap wing to contact said second stop surface, and partially block said flap tube;

said first and second stop surfaces being arranged facing in opposite axial directions of said flap tube, and being arranged to face away from each other.

12. An exhaust gas flap in accordance with claim 11, wherein:
said first and second flap diaphragm parts are spaced from each other.

* * * * *